(12) United States Patent
Prakash et al.

(10) Patent No.: US 10,785,287 B2
(45) Date of Patent: *Sep. 22, 2020

(54) SECURE BINDING OF SOFTWARE APPLICATION TO A COMMUNICATION DEVICE

(71) Applicant: Vista International Service Association, San Francisco, CA (US)

(72) Inventors: Gyan Prakash, Foster City, CA (US); Selim Aissi, Dublin, CA (US); Rasta Mansour, Cupertino, CA (US); Ajit Gaddam, Foster City, CA (US)

(73) Assignee: Visa International Service Association, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/192,694

(22) Filed: Nov. 15, 2018

(65) Prior Publication Data
US 2019/0089774 A1    Mar. 21, 2019

Related U.S. Application Data

(63) Continuation of application No. 14/841,202, filed on Aug. 31, 2015, now Pat. No. 10,178,164.

(51) Int. Cl.
*H04L 29/08* (2006.01)
*H04L 29/06* (2006.01)
(Continued)

(52) U.S. Cl.
CPC ........ *H04L 67/1002* (2013.01); *G06F 9/4881* (2013.01); *G06F 21/44* (2013.01);
(Continued)

(58) Field of Classification Search
CPC ..... H04L 67/1002; H04L 67/34; H04L 67/42; G06F 9/4881; G06F 21/44; G06F 21/629; G06F 21/73
See application file for complete search history.

(56) References Cited

U.S. PATENT DOCUMENTS 9,525,705 B2 * 12/2016 Violleau ............. H04L 63/0853
2004/0059938 A1    3/2004 Hughes et al.
(Continued)

FOREIGN PATENT DOCUMENTS

CN      104065616      9/2014
WO      2012087762 A1  6/2012

OTHER PUBLICATIONS

International Search Report / Written Opinion dated Nov. 29, 2016 in PCT Application No. PCT/US2016/048572, 11 pages.
(Continued)

*Primary Examiner* — Viet D Vu
(74) *Attorney, Agent, or Firm* — Kilpatrick Townsend & Stockton LLP

(57) ABSTRACT

Techniques for securely binding a software application to a communication device may include sending a set of device identifiers associated with the computing device to a server, receiving a server-generated dynamic device identifier that is generated based on the set of device identifiers; and storing the server-generated dynamic device identifier during initialization of the application. During runtime execution of the application, the application may receive a request to execute an application specific task. In response to receiving the request, the application may generate a runtime dynamic device identifier, determine whether the runtime dynamic device identifier matches the server-generated dynamic device identifier, execute the application specific task when the runtime dynamic device identifier matches the server-generated dynamic device identifier; and prevent the application specific task from being executed when the runtime dynamic device identifier does not match the server-generated dynamic device identifier.

20 Claims, 8 Drawing Sheets

(51) Int. Cl.
*G06F 21/44* (2013.01)
*G06F 21/62* (2013.01)
*G06F 21/73* (2013.01)
*G06F 9/48* (2006.01)

(52) U.S. Cl.
CPC ............ *G06F 21/629* (2013.01); *G06F 21/73* (2013.01); *H04L 67/34* (2013.01); *H04L 67/42* (2013.01)

(56) References Cited

U.S. PATENT DOCUMENTS

| | | |
|---|---|---|
| 2008/0319779 A1 | 12/2008 | Hughes |
| 2009/0138704 A1* | 5/2009 | Delerablee ............ H04L 9/0833 713/158 |
| 2011/0213969 A1 | 9/2011 | Nakhjiri |
| 2013/0340048 A1 | 12/2013 | Sebastian |
| 2014/0025521 A1 | 1/2014 | Alsina |
| 2014/0122885 A1 | 5/2014 | Wu et al. |
| 2014/0157368 A1 | 6/2014 | Shah |
| 2014/0237568 A1 | 8/2014 | Sista |
| 2014/0281506 A1 | 9/2014 | Redberg |
| 2014/0325683 A1 | 10/2014 | Dwivedi et al. |
| 2015/0074765 A1 | 3/2015 | Haight |
| 2018/0026973 A1* | 1/2018 | Le Saint ................ G06Q 20/18 713/168 |

OTHER PUBLICATIONS

Anonymous, Android (operating system)—Aug. 3, 2015, XP055536048 rerieved from the Internet: URL:https://en.wikipedia.org/w/index.php?title—Android operating system)&ol di d=674400324 [retrieved on Dec. 18, 2018]* Section *Applications*.

Supplementary European Search Report, dated Jan. 4, 2019, in European Patent Application No. 16842631.0, 9 pages.

Application No. CN201680049444.1 , Office Action, dated Jun. 30, 2020, 19 pages with English Translation.

* cited by examiner

| KEY | SOURCE | USAGE |
|---|---|---|
| SERVER PUBLIC KEY 902 | EMBEDDED IN NDK | ENCRYPT INFORMATION SENT TO SERVER |
| DEVICE PRIVATE KEY 904 (e.g., RSA) | GENERATED BY NDK AT INITIALIZATION TIME | DIGITAL SIGNING OF INFORMATION SENT TO SERVER; DECRYPT INFORMATION RECEIVED FROM SERVER ENCRYPTED WITH DEVICE PUBLIC KEY |
| DEVICE DERIVATION KEY 906 | GENERATED BY NDK FROM NONCE PROVIDED BY SERVER | DECRYPT INFORMATION RECEIVED FROM SERVER ENCRYPTED WITH THE SERVER'S DEVIC DERIVATION KEY |
| CRYPTOGRAM KEY 908 (e.g., LUK) | PROVISIONED BY SERVER | CRYPTOGRAM GENERATION DURING RUNTIME |

FIG. 9

SECURE BINDING OF SOFTWARE APPLICATION TO A COMMUNICATION DEVICE

CROSS-REFERENCES TO RELATED APPLICATIONS

This application is a continuation of U.S. patent application Ser. No. 14/841,202, filed on Aug. 31, 2015, now U.S. Pat. No. 10,178,164 issued Jan. 8, 2019, which is incorporated by reference herein for all purposes.

BACKGROUND

A software application may have multiple software components or software layers (may also be referred to as software libraries) that communicate or exchange data with each other. For example, code executing in one layer may call functions implemented in another layer, or code executing in one layer may pass parameters to another layer. Because of the modularized nature of such a software application, a security vulnerability may exist where a hacker can extract a software layer from a legitimate device that had originally installed the application, integrate the software layer into a malicious application, and then run the malicious application on another device.

Embodiments of the present invention address these and other problems individually and collectively.

BRIEF SUMMARY

Embodiments of the present invention provide techniques for securely binding a software application to a communication device to prevent one or more software layers of the application from being extracted and used on an unauthorized device. For example, the application may be partitioned into a software development kit (SDK) and a native development kit (NDK). In some embodiments, security-sensitive functions may be implemented in the NDK, and the techniques described herein can prevent the NDK from being extracted from an authorized device and be used on an unauthorized device.

In some embodiments, a method for securely binding an application may include sending a set of device identifiers associated with the computing device to a server, receiving a server-generated dynamic device identifier that is generated based on the set of device identifiers; and storing the server-generated dynamic device identifier during initialization of the application. During runtime execution of the application, the application may receive a request to execute an application specific task. In response to receiving the request, the application may generate a runtime dynamic device identifier, determine whether the runtime dynamic device identifier matches the server-generated dynamic device identifier, execute the application specific task when the runtime dynamic device identifier matches the server-generated dynamic device identifier; and prevent the application specific task from being executed when the runtime dynamic device identifier does not match the server-generated dynamic device identifier.

In some embodiments, a communication device may include a processor and a memory coupled to the processor. The memory may store instructions, which when executed by the processor, causes the communication device to perform operations for securely binding an application to the communication device. During initialization of the application on the communication device, the application may send a set of device identifiers associated with the computing device to a server, receive a server-generated dynamic device identifier that is generated by the server based on the set of device identifiers, and store the server-generated dynamic device identifier. During runtime execution of the application, the application may receive a request to execute an application specific task. In response to receiving the request, the application may generate a runtime dynamic device identifier, determine whether the runtime dynamic device identifier matches the server-generated dynamic device identifier, execute the application specific task when the runtime dynamic device identifier matches the server-generated dynamic device identifier, and prevent the application specific task from being executed when the runtime dynamic device identifier does not match the server-generated dynamic device identifier.

BRIEF DESCRIPTION OF THE DRAWINGS

FIG. 9 illustrates various keys that an application may use, according to some embodiments.

DETAILED DESCRIPTION

Figure 1:
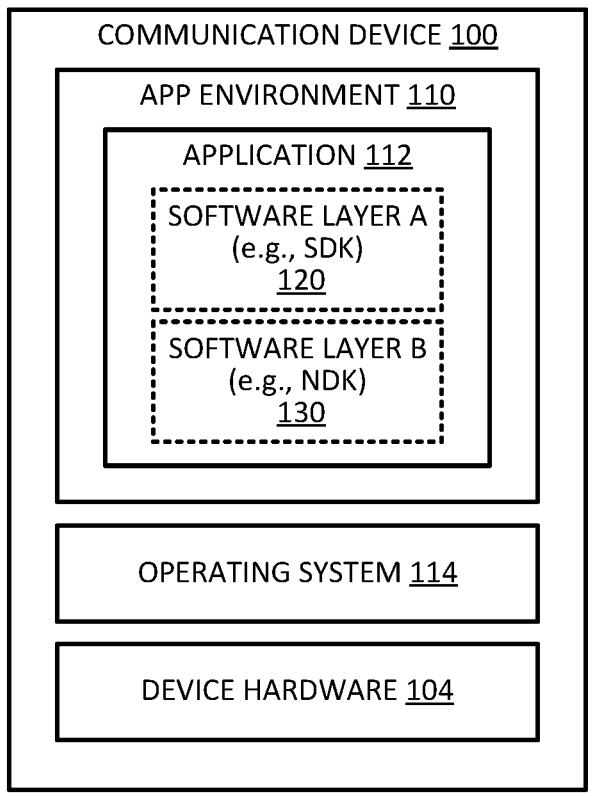
FIG. 1 illustrates a block diagram of an example of a communication device, according to some embodiments.

Embodiments of the present invention provide techniques to securely bind a software application to a device to prevent a software library extracted from a device from being used on an unauthorized device. During the first time initialization of the software application (e.g., when the software application is first compiled and installed on a device, or the first time that the software application is activated), the software application may execute a binding algorithm to obtain a dynamic device identifier from an application server associated with the software application. The dynamic device identifier can be generated by the server based on a set of device identifiers associated with the device. The server-generated dynamic device identifier can be stored as part of the software application. During runtime execution of the software application, the software application may generate a runtime dynamic device identifier and verify whether the runtime dynamic device identifier matches the server-generated dynamic device identifier from initialization. If the two dynamic device identifiers match, it is likely that the device currently executing the software application is the same device that originally installed the software application, and execution of the software application is allowed to continue. If the runtime dynamic device does not match the server-generated dynamic device identifier stored during initialization, then the device currently executing the software application may be a different device than the one that had originally installed the software application. This may occur, for example, if the original device that had installed the software application was hacked, and the software library being executed was extracted from the original device and is being run on an unauthorized device. The server-generated dynamic device identifier obtained during first time initialization provides a way for the software application to authenticate the device executing the software application during runtime, because an unauthorized device would not have the proper device identifiers at runtime to generate a matching dynamic device identifier.

Prior to discussing the details of some embodiments of the present invention, description of some terms may be helpful in understanding the various embodiments.

A "communication device" may be a device that includes one or more electronic components (e.g., an integrated chip) that can communicate with another device. For example, a communication device can be a computing device that includes at least one processor coupled to a memory that stores instructions or code for execution by the processor. A "portable communication device" can be a communication device that can be transported and operated by a user. A portable communication device may provide remote communication capabilities to a network. A portable communication device can be configured to transmit and receive data or communications to and from other devices. A portable communication device may be in the form of a mobile device such as a mobile phone (e.g., smart phone, cellular phone, etc.), tablets, portable media player, personal digital assistant devices (PDAs), wearable computing device (e.g., watch), health monitoring device, electronic reader device, etc., or in the form of a card (e.g., smart card) or a fob, etc. Examples of portable communication devices may also include portable computing devices (e.g., laptops, netbooks, ultrabooks, etc.). A portable communication device may also be in the form of a vehicle (e.g., an automobile), or be integrated as part of a vehicle (e.g., an infosystem of a vehicle).

A "server computer" may include a powerful computer or cluster of computers. For example, the server computer can be a large mainframe, a minicomputer cluster, or a group of servers functioning as a unit. In one example, the server computer may be a database server coupled to a Web server. The server computer may be coupled to a database and may include any hardware, software, other logic, or combination of the preceding for servicing the requests from one or more client computers. The server computer may comprise one or more computational apparatuses and may use any of a variety of computing structures, arrangements, and compilations for servicing the requests from one or more client computers.

An "issuer" may typically refer to a business entity (e.g., a bank) that maintains an account for a user that is associated with a portable communication device such as an account enrolled in a mobile application installed on a portable communication device. An issuer may also issue account parameters associated with the account to a portable communication device. An issuer may be associated with a host system that performs some or all of the functions of the issuer on behalf of the issuer.

A "merchant" may typically be an entity that engages in transactions and can sell goods or services, or provide access to goods or services.

An "acquirer" may typically be a business entity (e.g., a commercial bank) that has a business relationship with a particular merchant or other entity. Some entities can perform both issuer and acquirer functions. Some embodiments may encompass such single entity issuer-acquirers.

An "access device" may be any suitable device for communicating with a merchant computer or payment processing network, and for interacting with a payment device, a user computer apparatus, and/or a user mobile device. An access device may generally be located in any suitable location, such as at the location of a merchant. An access device may be in any suitable form. Some examples of access devices include POS devices, cellular phones, PDAs, personal computers (PCs), tablet PCs, hand-held specialized readers, set-top boxes, electronic cash registers (ECRs), automated teller machines (ATMs), virtual cash registers (VCRs), kiosks, security systems, access systems, Websites, and the like. An access device may use any suitable contact or contactless mode of operation to send or receive data from, or associated with, a portable communication device. In some embodiments, where an access device may comprise a POS terminal, any suitable POS terminal may be used and may include a reader, a processor, and a computer-readable medium. A reader may include any suitable contact or contactless mode of operation. For example, exemplary card readers can include radio frequency (RF) antennas, optical scanners, bar code readers, or magnetic stripe readers to interact with a portable communication device.

An "authorization request message" may be an electronic message that is sent to request authorization for a transaction. The authorization request message can be sent to a payment processing network and/or an issuer of a payment card. An authorization request message according to some embodiments may comply with ISO 8583, which is a standard for systems that exchange electronic transaction information associated with a payment made by a user using a payment device or payment account. The authorization request message may include information that can be used to identify an account. An authorization request message may also comprise additional data elements such as one or more of a service code, an expiration date, etc. An authorization request message may also comprise transaction information, such as any information associated with a current transaction, such as the transaction amount, merchant identifier, merchant location, etc., as well as any other information that may be utilized in determining whether to identify and/or authorize a transaction. The authorization request message may also include other information such as information that identifies the access device that generated the authorization request message, information about the location of the access device, etc.

An "authorization response message" may be an electronic message reply to an authorization request message. The authorization response message can be generated by an issuing financial institution or a payment processing network. The authorization response message may include, by way of example only, one or more of the following status indicators: Approval—transaction was approved; Decline—transaction was not approved; or Call Center—response pending more information, merchant must call the toll-free authorization phone number. The authorization response message may also include an authorization code, which may be a code that a credit card issuing bank returns in response to an authorization request message in an electronic message (either directly or through the payment processing network) to the merchant computer that indicates approval of the transaction. The code may serve as proof of authorization. As noted above, in some embodiments, a payment processing network may generate or forward the authorization response message to the merchant.

The term "authentication" and its derivatives may refer to a process by which the credential of an endpoint (including but not limited to applications, people, devices, processes, and systems) can be verified to ensure that the endpoint is who they are declared to be.

The term "verification" and its derivatives may refer to a process that utilizes information to determine whether an underlying subject is valid under a given set of circumstances. Verification may include any comparison of information to ensure some data or information is correct, valid, accurate, legitimate, and/or in good standing.

A "token" may include a substitute identifier for some information. For example, a payment token may include an identifier for a payment account that is a substitute for an account identifier, such as a primary account number (PAN). For instance, a token may include a series of alphanumeric characters that may be used as a substitute for an original account identifier. For example, a token "4900 0000 0000 0001" may be used in place of a PAN "4147 0900 0000 1234." In some embodiments, a token may be "format preserving" and may have a numeric format that conforms to the account identifiers used in existing payment processing networks (e.g., ISO 8583 financial transaction message format). In some embodiments, a token may be used in place of a PAN to initiate, authorize, settle or resolve a payment transaction. The token may also be used to represent the original credential in other systems where the original credential would typically be provided. In some embodiments, a token value may be generated such that the recovery of the original PAN or other account identifier from the token value may not be computationally derived. Further, in some embodiments, the token format may be configured to allow the entity receiving the token to identify it as a token and recognize the entity that issued the token.

A "real account identifier" may include an original account identifier associated with a payment account. For example, a real account identifier may be a primary account number (PAN) issued by an issuer for a card account (e.g., credit card, debit card, etc.). For instance, in some embodiments, a real account identifier may include a sixteen digit numerical value such as "4147 0900 0000 1234." The first six digits of the real account identifier (e.g., "414709"), may represent a real issuer identifier (BIN) that may identify an issuer associated with the real account identifier.

"Account parameters" may refer to information relating to an account that can be used to conduct a transaction on the account. Examples of account parameters may include information that can be used to identify an account of the user (e.g., real account identifier, alternate account identifier, token, etc.), data or information relating to the status of the account, one or more keys that are used to generate cryptographic information, data or information relating to the one or more keys, etc. An account parameter can be semi-static or dynamic. A dynamic account parameter may be an account parameter that has a limited lifespan, and which once expired, can no longer be used to conduct a transaction until the account parameter is replenished, refreshed, or renewed. A dynamic account parameter may be replenished frequently during the lifetime of an account. A semi-static account parameter may be an account parameter that has an extended lifespan that is longer than a dynamic account parameter, and can be replenished less frequently than a dynamic account parameter or not at all during the lifetime of the account.

A "key" may refer to a piece of information that is used in a cryptographic algorithm to transform input data into another representation. A cryptographic algorithm can be an encryption algorithm that transforms original data into an alternate representation, or a decryption algorithm that transforms encrypted information back to the original data. Examples of cryptographic algorithms may include triple data encryption standard (TDES), data encryption standard (DES), advanced encryption standard (AES), etc.

A "cryptogram" may refer to an encrypted representation of some information. A cryptogram can be used by a recipient to determine if the generator of the cryptogram is in possession of a proper key, for example, by encrypting the underlying information with a valid key, and comparing the result to the received cryptogram.

A "limited-use threshold" may refer to a condition that limits the usage of a piece of information. A limited-use threshold may be exceeded or exhausted when the underlying condition is met. For example, a limited-use threshold may include a time-to-live that indicates an amount of time for which a piece of information is valid, and once that amount of time has elapsed, the limited-use threshold is exceeded or exhausted, and the piece of information may become invalid and may no longer be used. As another example, a limited-use threshold may include a number of times that a piece of information can be used, and once the piece of information has been used for that number of times, the limited-use threshold is exceeded or exhausted, and the piece of information may become invalid and may no longer be used.

A "transaction processing network" may include a network that can process and route transaction request messages. An exemplary transaction processing network may include data processing subsystems, networks, and operations used to support and deliver authorization services, exception file services, transaction scoring services, and clearing and settlement services. An exemplary transaction processing network may include VisaNet™. Transaction processing networks such as VisaNet™ are able to process credit card transactions, debit card transactions, and other types of commercial transactions. VisaNet™, in particular, may include a VIP system (Visa Integrated Payments system) which processes authorization requests and a Base II system which performs clearing and settlement services.

A "public/private key pair" may refer to a pair of linked cryptographic keys generated by an entity. The public key may be used for public functions such as encrypting a message to send to the entity or for verifying a digital signature which was supposedly made by the entity. The private key, on the other hand may be used for private functions such as decrypting a received message or applying a digital signature. The public key will usually be authorized by a body known as a Certification Authority (CA) which stores the public key in a database and distributes it to any other entity which requests it. The private key will typically be kept in a secure storage medium and will usually only be known to the entity. However, the cryptographic systems described herein may feature key recovery mechanisms for recovering lost keys and avoiding data loss. Public and private keys may be in any suitable format, including those based on Rivest-Shamir-Adleman (RSA) or elliptic curve cryptography (ECC).

A "digital signature" may refer to the result of applying an algorithm based on a public/private key pair, which allows a signing party to manifest, and a verifying party to verify, the authenticity and integrity of a document. The signing party acts by means of the private key and the verifying party acts by means of the public key. This process certifies the authenticity of the sender, the integrity of the signed document and the so-called principle of nonrepudiation, which does not allow disowning what has been signed. A certificate or other data that includes a digital signature by a signing party is said to be "signed" by the signing party.

A "certificate" or "digital certificate" may include an electronic document or data file that uses a digital signature to bind a public key with data associated with an identity. The certificate may include one or more data fields, such as the legal name of the identity, a serial number of the certificate, a valid-from and valid-to date for the certificate, certificate-related permissions, etc. A certificate may contain a "valid-from" date indicating the first date the certificate is valid, and a "valid-to" date indicating the last date the certificate is valid. A certificate may also contain a hash of the data in the certificate including the data fields.

A "nonce" may refer to a number, string, bit sequence, or other data value. A nonce may be randomly or pseudo-randomly generated. A nonce can be of sufficient length such that independently generating the same nonce value multiple times would be unlikely. A nonce can be used as a seed value to generate a key or other types of authentication data. A nonce may also be referred to as a salt value.

"Sensitive information" may refer to information for which protection from unauthorized usage is desired, or information for which privacy protection is desired. For example, sensitive information may refer to confidential information, or may refer to information that can be used by an unauthorized entity to commit fraud such as fraudulent transactions or identity theft. Examples of sensitive information may include trade secret, corporate confidential information, confidential legal documents, government protected data, etc. Examples of sensitive information may also include personal information such as health data, social security number, contact information, location information, and/or financial information such as account identifiers, rewards information, loyalty program information, etc. Sensitive information may also include cryptographic keys that can be used to encrypt or decrypt information.

Details of some embodiments of the present invention will now be described.

I. Secure Application Binding Overview

FIG. 1 illustrates a communication device 100, according to some embodiments. Communication device 100 can be a computing device, and in some implementations, can be a portable communication device such as a mobile device. Communication device 100 may include device hardware 104 such as one or more processors, an operating system 114, and an application 112 running on communication device 100. In some embodiments, application 122 can be executing within an application environment 110 such as a virtual machine 110.

Application 112 may include multiple software layers or software libraries. For example, application 122 may include software layer 120 and software layer 130. Software layers 120 and 130 can be provided by the same developer or be provided by different entities. In some embodiments, software layers 120 and 130 can be written in the same or different programming languages. For example, software layer 120 can be written in a high level programming language, and can be implemented as a software development kit (SDK). Software layer 130 can be a native library such as a native development kit (NDK), and can be written in a low level programming language. In some embodiments, software layer 130 can be a native library that can be shared amongst various applications executing in application environment 110. Software layer 120 can communicate with software layer 130 to exchange data and invoke functions implemented in software layer 130, and vice versa, via an interface between the two software layers.

In some embodiments, operating system 114 can be a mobile operating system such as Android. Software layer 120 can be written in Java, and software layer 130 can be written in a C or C++. In such embodiments, the interface between software layers 120 and 130 can be a Java Native Interface (JNI). During compilation of application 112, the Java software layer 120 source code can be compiled using a Java complier such as Javac into Java class files. The C or C++ code headers which allow software layer 120 to call functions in software layer 130 can be generated by a header file generator such as Javah. The native C or C++ software layer 130 source code can be compiled and linked to the header files to form a shared object (.so) dynamic library file. The Java class files and the dynamic library file can be packaged and compressed into an application package file (e.g., an Android application package (.apk) file). This application package file can be downloaded from an application store onto communication device 100, and is used to install application 112 onto communication device 100. In some embodiments, installing application 112 will instantiate a virtual machine instance such as a Dalvik virtual machine instance from which application 112 will execute.

In some embodiments, application 112 can be an application that uses or processes sensitive information. For example, application 112 may use certain sensitive data assets such as encryption keys to perform cryptographic operations, or may access or use sensitive information such as personal or financial information. Functions related to the processing of sensitive information (may be referred to as security-sensitive functions) can be implemented in the native software layer 130, whereas basic functions such as user interface and external communication (e.g., networking) functionalities can be implemented in software layer 120. Due to the modularized nature of application 112, without proper safeguards, the native software layer 130 implementing the security-sensitive functions can be susceptible to hacking attempts that seek to comprise the underlying sensitive information. For example, the shared object (.so) dynamic library file implementing the native software layer 130 can be extracted directly from the application package file, or from an installed version of software application 112 on a device. The dynamic library file can then be disassembled to reverse engineer the code, and be integrated into a malicious application. The malicious application integrating the compromised dynamic library can be installed on an unauthorized device, and can be executed to access sensitive information and perform security-sensitive functions.

Figure 2:
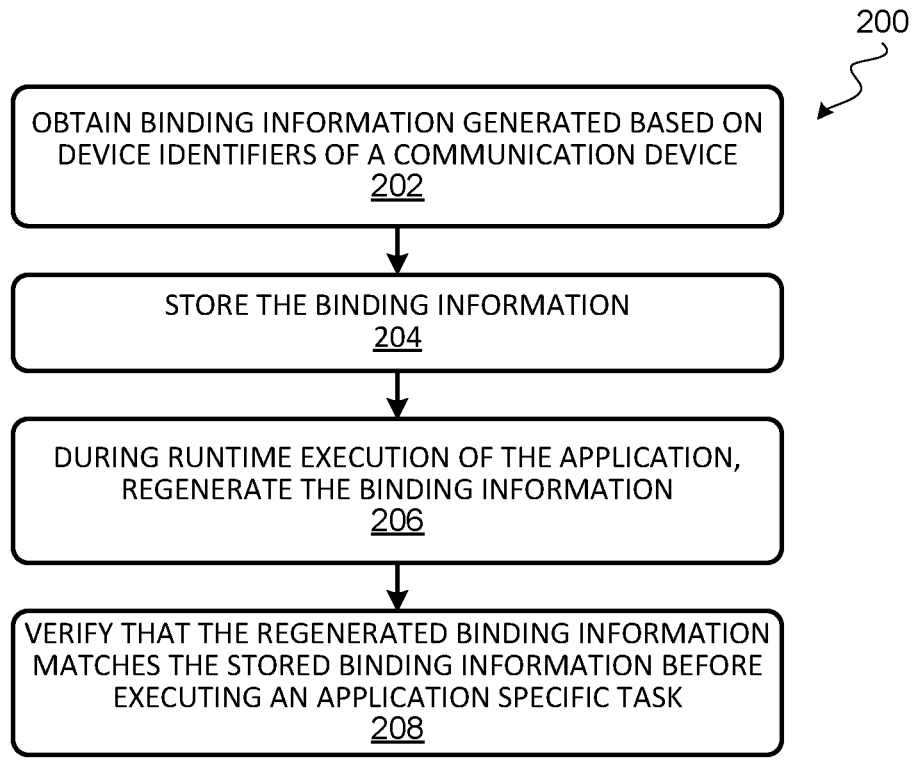
FIG. 2 illustrates a flow diagram of a process for binding a software application to a communication device, according to some embodiments.

FIG. 2 illustrates a flow diagram of a software application binding process 200 that can be performed to reduce the risk of a software application from being executed on an unauthorized device, according to some embodiments. During first time initialization of the software application on a communication device (e.g., when the software application is first downloaded and installed on the communication device, or during first time activation of the software application, for example, if the software application is preloaded on the communication device), the software application may execute a binding algorithm to bind the software application to the communication device. At block 202, the software application may obtain binding information that is generated based on a set of device identifiers associated with the communication device. For example, the software application may send the set of device identifiers to a server associated with the software application, and the server may send back binding information that the server generated from the device identifies. At block 204, the software application may store the binding information, which the software application will use during runtime to verify the device executing the software application.

At some time later during runtime execution of the software application, the software application may regenerate the binding information from the set of device identifiers of the communication device at block 206. For example, in some embodiments, receiving a request at the software application to execute an application specific task (e.g., a security-sensitive function) may trigger the software application to regenerate and verify the binding information. At block 208, before executing the application specific task, the software application may compare the regenerated binding information against the binding information stored during initialization to verify that the regenerated binding information matches the stored binding information. If the regenerated binding information matches the stored binding information, then it is likely that the same device on which the software application was originally installed is the same device that is currently executing the software application, and execution of the application specific task can continue. If the regenerated binding information does not match the stored binding information, then the device currently executing the software application may be an unauthorized device, and the software application may halt execution of the application specific task.

II. Initialization Processes

Figure 3:
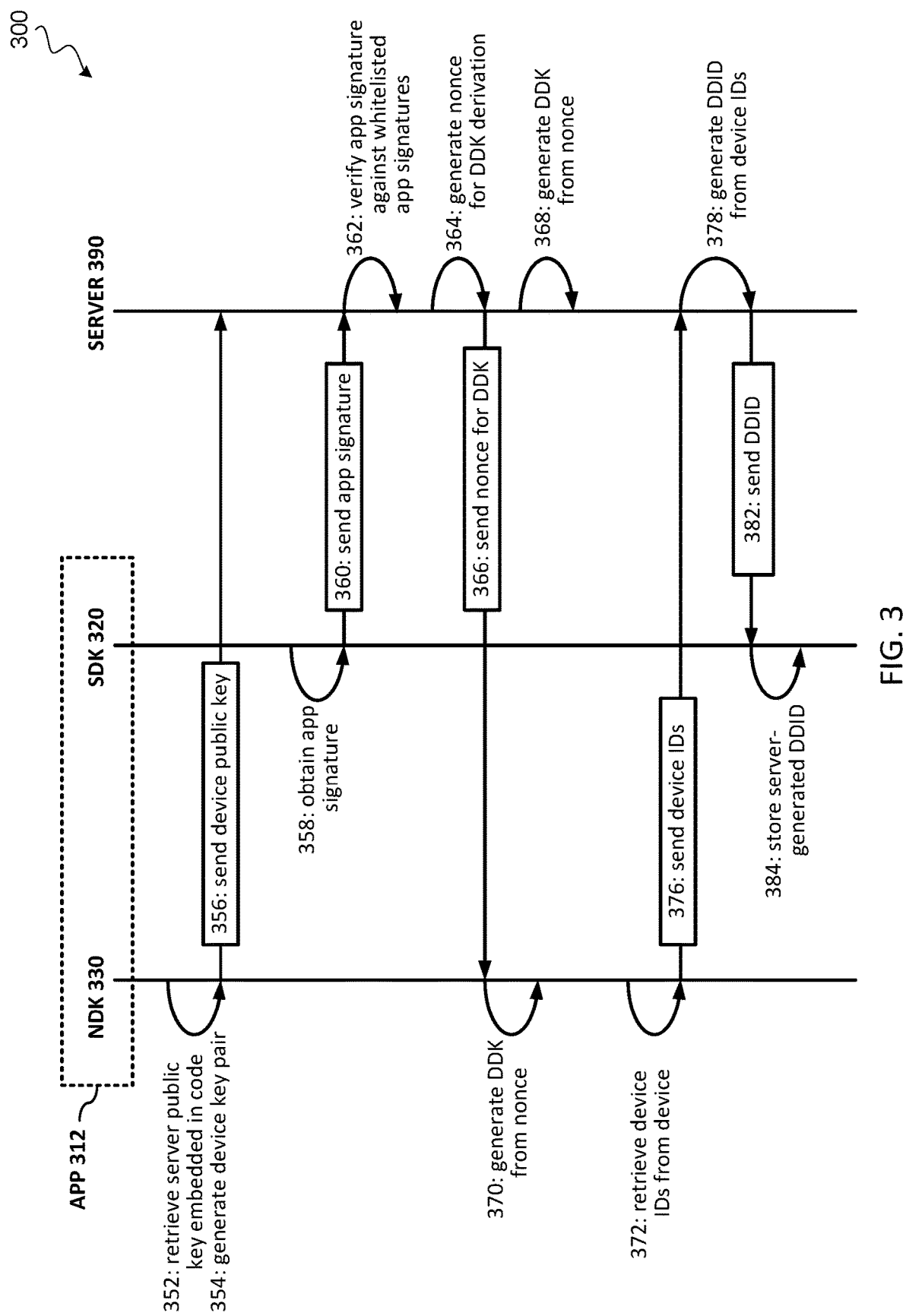
FIG. 3 illustrates an initialization process communication flow diagram, according to some embodiments.

FIG. 3 illustrates an initialization process flow 300 that can be performed between a server 390 and a software application 312 during first time initialization of application 312 on a communication device, according to some embodiments. Server 390 can be operated by an application provider of application 312, or a service provider that provides services for application 312. Application 312 may include a native development kit 330 (e.g., software layer 130 written in native programming language such as C or C++) and a software development kit 320 (e.g., software layer 120 written in a high level programming language such as Java). Functionalities for external communications (e.g., communications with server 390) performed by application 312 can be implemented in SDK 320. In some embodiments, communications between server 390 and application 312 can be carried out using a secure communication protocol such as transport layer security (TLS), secure sockets layer (SSL), or the like. The secure communication protocol may establish session keys that are used to encrypt the communications between application 312 and server 390. It should be noted that the specific keys discussed below may be separate and different than the session keys of the secure communication protocol, and that any encryption using the specific keys discussed below are performed in addition to the encryption of the communication channel between server 390 and application 312.

Prior to carrying out the initialization process flow 300, a user of a communication device may download application 312 from an application store onto the communication device. Alternatively, application 312 can be preloaded onto the communications device by the manufacturer of the communication device, or by a distributor or seller of the communication device such as a mobile network operator, etc. Initialization process flow 300 can be performed when the user of the communication device initiates installation of application 312 after downloading application 312, or when the user first activates and runs application 312 on the communication device.

At step 352, NDK 330 may retrieve a server public key associated with server 390. The server public key can be embedded in the code of NDK 330 (e.g., embedded in the shared object dynamic library file), and is distributed as part of application 312. The server public key is the public component of a server public-private key pair, and the server public key is embedded in application 312 to provide application 312 with an encryption key to encrypt information sent by application 312 to server 390. The server private key is maintained at server 390, and is used by server 390 to decrypt information that the server receives from application 312.

At step 354, NDK 330 may generate a device key pair including a device private key and a device public key. For example, the device key pair can be a RSA (Rivest-Shamir-Adleman) key pair. In some embodiments, NDK 330 may request a nonce from server 390 (not shown), and generate the device key pair based on the nonce. In some embodiments, the device key pair can be generated by application 312 without requesting a nonce from server 390. The device private key is used by application 312 to digitally sign information sent by application 312 to server 390, and to decrypt information received from server 390. At step 356, the device public key is sent to server 390 such that server 390 can authenticate information signed by the device private key. The device public key is also used by server 390 to encrypt information sent to application 312 during initialization.

At step 358, SDK 320 (or NDK 330) may obtain an application signature of application 312. For example, the application signature can be obtained by computing a hash value over the application file of application 312 (e.g., a hash of the application package file). The application signature may also include metadata associated with application 312 such as version number, source, etc. At step 360, the application signature is sent from SDK 320 to server 390. In some embodiments, the application signature can be encrypted by the server public key retrieved from step 352, and sent to server 390 in an encrypted form. The application signature may also be signed by the device private key.

At step 362, server 390 receives the application signature, and verifies the application signature against a set of whitelisted application signatures. The whitelisted application signatures are approved known-good application signatures from authorized application publishers and developers that server 390 maintains, and are used by server 390 to verify the integrity of an application (e.g., that the application has not been hacked or modified) and/or the source of an application (e.g., that the application was downloaded or originated from an authorized source). If the application signature from application 312 fails to match one of the approved whitelisted application signatures, server 390 may notify application 312 that application 312 is an unauthorized application and stop responding to application 312. If the application signature sent from application 312 matches one of the approved whitelisted application signatures, initialization of application 312 may continue.

In some embodiments, in response to verifying that the application signature from application 312 matches one of the whitelisted application signatures, server 390 may, at step 364, generate a nonce for deriving a device derivation key (DDK) (may be referred to as the DDK derivation nonce). At step 366, sever 390 may send the DDK derivation nonce to SDK 320, which then forwards the DDK derivation nonce to NDK 330. In some embodiments, server 390 may encrypt the DDK derivation nonce prior to sending it to SDK 320. For example, the DDK derivation nonce can be encrypted using the device public key. At step 368, server 390 may derive the device derivation key from the DDK derivation nonce, and associate the resulting DDK with application 312. For example, the DDK can be generated by applying a key derivation function to the DDK derivation nonce. At step 370, NDK 330 generates its own DDK from the DDK derivation nonce received from server 390. In some embodiments, the DDK derivation nonce and/or DDK can be protected by application 312 using white box cryptography including code encryption and code obfuscation techniques.

The device derivation key (DDK) is a symmetric key used by server 390 and application 312 to encrypt and decrypt information sent between them. In some embodiments, once the DDK has been generated on both ends, further information sent between server 390 and application 312 can be encrypted with the DDK instead of the device and server public keys. In some embodiments, once the DDK has been generated, further information sent between server 390 and application 312 can be encrypted with the DDK first, and then further encrypted using the respective device and server public keys.

At this point in the initialization process flow 300, the necessary keys for binding application 312 to the communication device have been established, and the binding information that binds application 312 to the communication device can now be generated. At step 372, NDK 330 retrieves a set of device identifiers from the communication device. The set of device identifiers may include static device identities such as hardware identifiers of the communication device, hardware identifiers of one or more components of the communication device, and/or other static identifiers that are used to bind the communication device to a user. For example, the device identifiers may include one or more of a unique device identifier of the communication device, an electronic serial number of the communication device, a serial number of a component of the communication device (e.g., a subscriber identity module (SIM) serial number), a media access control (MAC) address of the communication device, an International Mobile Station Equipment Identity (IMEI) number, a International Mobile Subscriber Identity (IMSI) number, a network services framework identifier, etc. In some embodiments, one or more of the device identifiers may be immutable and do not change during the lifetime of the communication device. In some embodiments, one or more of the device identifiers may be immutable as long as the communication device remains associated with the same user.

At step 376, NDK 330 provides SDK 320 with the set of device identifiers to send to server 390. The set of device identifiers may include multiple device identifiers. In some embodiments, three to five device identifiers can be used. At step 378, server 390 receives the set of device identifiers, and generates a dynamic device identifier (DDID) based on the set of device identifiers. For example, the DDID can be generated by computing a hash value over the set of device identifiers. In some embodiments, the hash value can be computed as a hash message authentication code (HMAC) using a hash function such as a message digest variant (e.g., MD5, MD4, etc.) or a secure hash algorithm variant (e.g., SHA-3, SHA-2, SHA-1, etc.). In some embodiments, the DDID can also be generated based on the set of device identifiers and a DDID salt generated by server 390. For example, the DDID salt can be combined with the set of device identifiers to form the input to the hash function, or the DDID salt can be used as the key for the hash function.

In some embodiments, instead of using the entire length of each device identifier in the received set of device identifiers, selected portions of each device identifier can be used. For example, the last one or two bytes of each device identifier can be used, or a different byte from each device identifier can be used (e.g., first byte of first device identifier, second byte of second device identifier, etc.).

At step 382, the DDID generated by server 390 (may be referred to as the server-generated DDID) is sent to application 312. In some embodiments, the server-generated DDID is encrypted with the DDK, and is sent to application 312 in the encrypted form. If a DDID salt was used in the generation of the server-generated DDID, the DDID salt is also sent to application 312. The DDID salt can also be encrypted with the DDK. The DDID and/or DDID salt can also be signed by server 390 using the server private key. At step 384, SDK 320 (or NDK 330) stores the server-generated DDID. If a DDID salt was used in the generation of the server-generated DDID, the DDID salt can be stored by NDK 330. In some embodiments, the DDID and the DDID salt are stored by application 312 in their DDK encrypted form. In some embodiments, the DDID and/or DDID salt can be stored as part of the code in application 312 (e.g., part of the shared object (.so) dynamic library file), and can be protected by application 312 using white box cryptography including code encryption and code obfuscation techniques.

In some embodiments, a post-binding application digest (e.g., a checksum or hash) can also be calculated over application 312 after the server-generated DDID has been incorporated into application 312. Because the post-binding application digest takes the server-generated DDID into account, the post-binding application digest on one device may be different than the post-binding application digest on another device. The post-binding application digest can be stored by application 312, and be used as a further verification mechanism to verify the communication device during runtime execution of application 312.

III. Runtime Processes

After performing initialization process flow 300, application 312 is now bound to the communication device by the DDID. During runtime of application 312, the DDID is used by application 312 to verify the communication device executing application 312. Application 312 may verify the DDID each time application 312 is launched or started, and/or each time application 312 receives a request to perform a particular application specific task (e.g., to perform a security-sensitive function).

Figure 4:
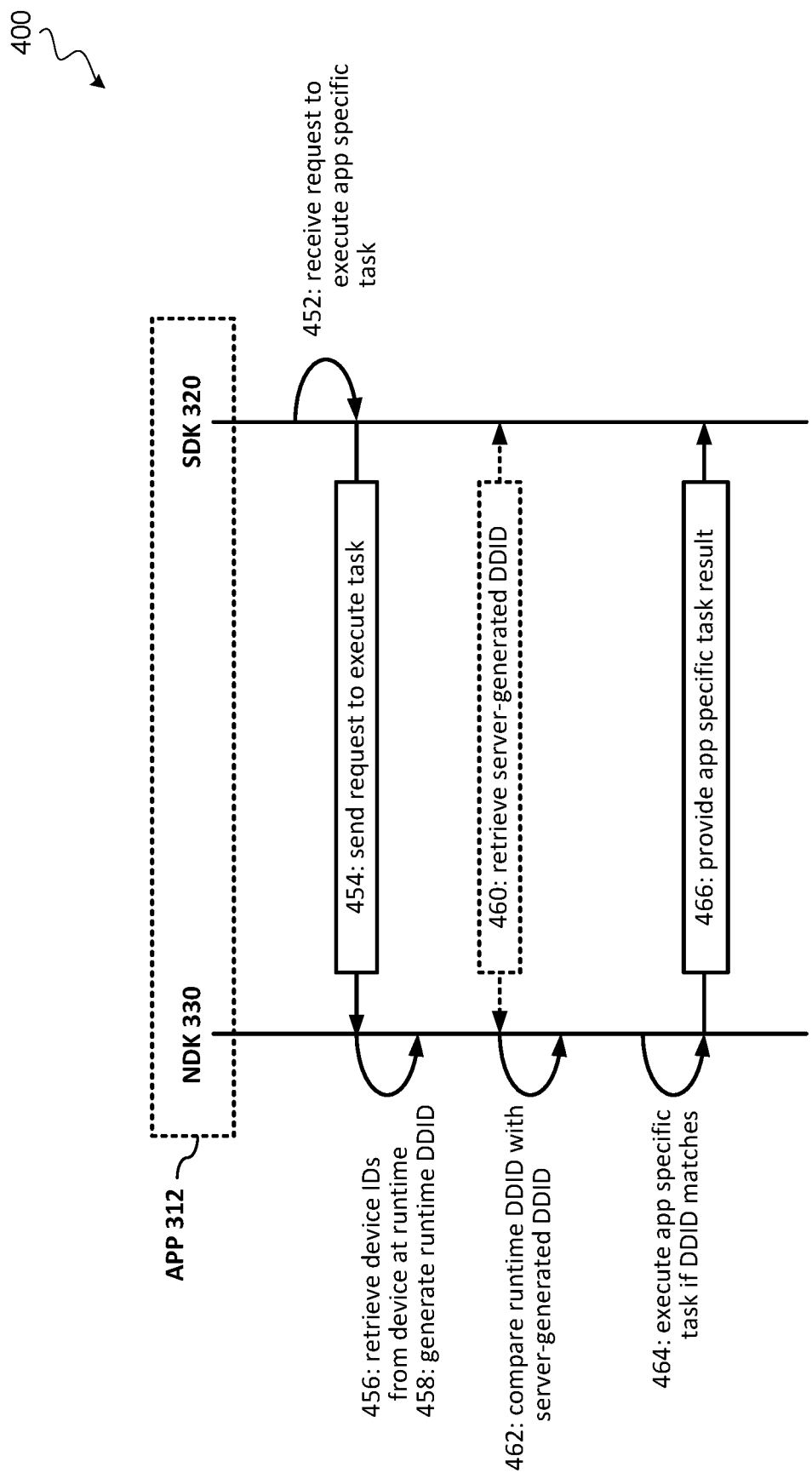
FIG. 4 illustrates a runtime process communication flow diagram, according to some embodiments.

FIG. 4 illustrates a runtime process flow 400 that can be performed by software application 312 during runtime of application 312 when being executed on a communication device, according to some embodiments. At step 452, application 312 receives a request to execute an application specific task that application 312 is programmed to perform. The request may be received by SDK 320 in response to a user interacting with application 312 (e.g., a user tapping a user interface of the communication device to instruct application 312 to perform a function), or in response to a system process interacting with application 312 (e.g., another application or operating system interacting with application 312). The request to execute the application specific task can be, for example, a request to perform a security-sensitive function such as accessing or using sensitive information (e.g., personal or financial account data). It should be noted that in some embodiments, application 312 may allow some application specific tasks (e.g., basic functions such as displaying messages on a user interface) to execute without requiring verification of the DDID, while other application specific tasks (e.g., security-sensitive tasks) may require the DDID to be verified before proceeding with execution of the task.

At step 454, the request to execute the application specific task is forwarded from SDK 320 to NDK 330. At step 456, in response to receiving the request to execute the application specific task, NDK 330 retrieves, at runtime, the set of device identifiers used for generating the DDID from the communication device that is executing application 312. If a DDID salt was by the server when generating the server-generated DDID, the DDID salt is retrieved and decrypted with the DDK if necessary. At step 458, NDK 330 generates a runtime DDID using the same algorithm (e.g., HMAC) that the server previously used for generating the server-generated DDID as described above.

At step 460, if the server-generated DDID was previously stored by SDK 320, NDK 330 retrieves the server-generated DDID from SDK 320. Alternatively, if the server-generated DDID was previously stored by NDK 330, NDK 330 retrieves the server-generated DDID from NDK 330. At step 462, NDK 330 compares the runtime DDID with the server-generated DDID to determine whether the runtime DDID matches the server-generated DDID. In some embodiments, the server-generated DDID may be stored in its encrypted form, and NDK 330 may encrypt the runtime DDID using the DDK, and compare the encrypted version of the server-generated DDID with the encrypted runtime DDID. In some embodiments, the server-generated DDID can be decrypted using the DDK, and the server-generated DDID can be compared with the runtime DDID in their unencrypted form.

At step 464, if the runtime DDID matches the server-generated DDID; the communication device currently executing application 312 is determined to be the same communication device that had originally installed application 312 and executed initialization process 300, and NDK 330 continues with execution of the application specific task. At step 466, NDK 330 provides the result of executing the application specific task to SDK 320. If the runtime DDID does not match the server-generated DDID; the communication device currently executing application 312 may be a different device than the device that had originally installed application 312 and executed initialization process 300. In such case, NDK 330 may prevent the application specific task from being executed. In some embodiments, NDK 330 may inform SDK 320 to display an error message on a user interface of the communication device to indicate that the request to execute the application specific task is not authorized.

In some embodiments, the post-binding application digest can be used as an additional mechanism for runtime verification of application 312. For example, in addition to verifying the DDID, when NDK 330 receives a request to execute an application specific task, NDK 330 may re-compute the post-binding application digest of application 312 at runtime, and compare it with the previously stored post-binding application digest to verify that application 312 has not been modified after initialization. In some embodiments, the DDID verification and post-binding application digest verification can be triggered by the same or different events. For example, both DDID and post-binding application digest verifications may be triggered each time application 312 is launched or started, whereas only DDID verification but not post-binding application digest verification may be triggered when a request to execute an application specific task is received.

IV. Transaction Application Example

Figure 5:
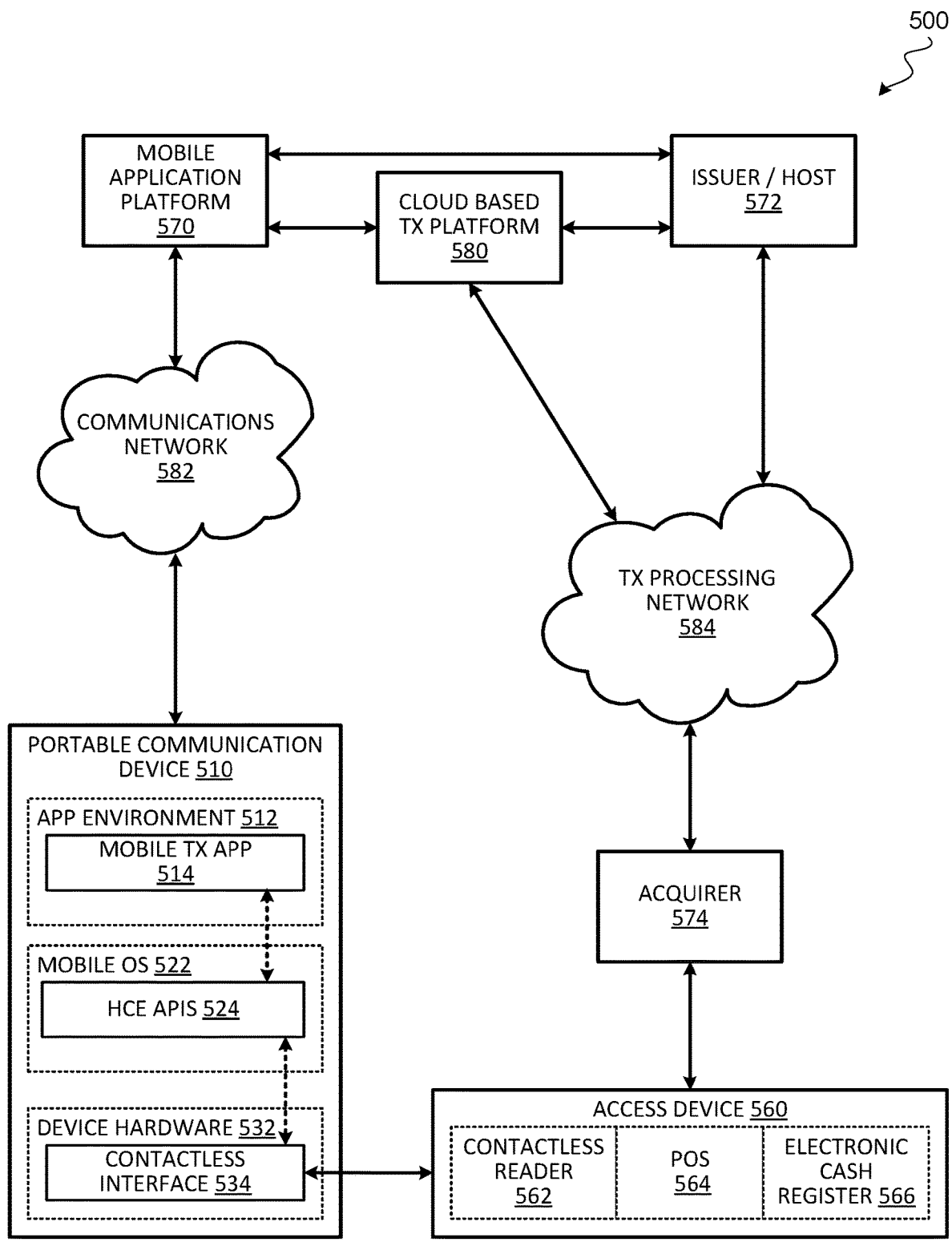
FIG. 5 illustrates a block diagram of an example of a system, according to some embodiments.

FIG. 5 illustrates a block diagram of an exemplary system 500 in which the secure application binding techniques described herein can be used, according to some embodiments. System 500 can be, for example, a cloud-based transaction system for conducting cloud-based transactions. System 500 includes a portable communication device 510 (e.g., a mobile device), a cloud-based transaction platform (CBP) 580, and a mobile application platform (MAP) 570. CBP 580 may be implemented using one or more computing devices, and can be associated with or operated by an issuer, payment processor, and/or other suitable entities. CBP 580 implements a set of functionalities including account management, and account parameters generation and replenishment to enable could-based transactions to be conducted via portable communication device 510. MAP 570 is used to facilitate communications between CBP 580 and mobile application 514 (e.g., a transaction application) in portable communication device 510. MAP 570 may be implemented using one or more computing devices, and can be associated with or operated by the service provider of mobile application 514 (e.g., mobile software application), such as an issuer, a mobile wallet provider, a merchant, and/or other suitable entities. In some embodiments, MAP 570 can be associated with or operated by the same entity as CBP 580, or they can be separate. MAP 570 is used to intermediate requests between the mobile application 514 and CBP 580, and to ensure that requests and responses initiated by either party are fulfilled once connectivity to portable communication device 510 is established, for example, via a communications network 582 (e.g., internet, mobile or cellular network, etc.). It should be understood that in some embodiments, one or more functionalities of CBP 580, MAP 570, and/or issuer or host processing system 572, may be integrated into the same computer or different computers.

Portable communication device 510 can be used to conduct cloud-based payment transactions facilitated by CBP 580 and/or MAP 570. Portable communication device 510 includes device hardware 532, mobile operating system (OS) 522, and applications environment 512. Device hardware 532 includes a contactless interface 534 that can contactlessly communicate or otherwise present information to another device such as a contactless reader 562 of an access device 560. Examples of contactless interface 534 can include a near-field communications (NFC) interface that can send and receive communications using radio frequency, or other wireless communication protocols such as Bluetooth, Bluetooth Low Energy (BLE), Wi-Fi, etc. Examples of contactless interface 534 may also include an optical interface such as a display to present information such as quick response (QR) codes, bar codes, etc.

Applications environment 512 of portable communication device 510 may include a mobile application 514 such as a transaction application provided by a service provider. For example, if the service provider of mobile application 514 is an issuer, mobile application 514 implementing a transaction application may be a mobile banking application or a mobile payment application. If the service provider is a mobile wallet provider such as a mobile network operator or third-party wallet provider that supports multiple issuers, mobile application 514 implementing a transaction application may be a mobile wallet application. For merchants, mobile application 514 may be a merchant's own transaction application from which consumers can conduct e-commerce or point of sale transactions, or a mobile wallet application supporting multiple merchants.

In some embodiments, mobile application 514 may include on-device cloud-based transaction logic integrated into mobile application 514 to support cloud-based transactions. The on-device cloud-based transaction logic performs functions to facilitate cloud-based transactions such as to take account parameters provided for use in payment transactions and deliver them to mobile operating system 522 for transmission over contactless interface 534. For example, the on-device cloud-based transaction logic may use a cryptogram key (e.g., a limited-use key) provisioned from CBP 580 to generate a transaction cryptogram that is transmitted over contactless interface to access device 560 to conduct a payment transaction. The transaction cryptogram can be sent over to the transaction processing network 584 to obtain authorization for the payment transaction. The on-device cloud-based transaction logic also manages the initial service profile parameters that are provided after an account has been provisioned to ensure that requests for account parameter replenishment and other account parameter management activities are initiated.

To provision portable communication device 510 for cloud-based payment transactions, CBP 580 can be used to configure account portfolios associated with issuers and to provide portable communication device 510 with account parameters for use when conducting cloud-based transactions. The account portfolios established by CBP 580 can include characteristics such as risk parameters (e.g., velocity controls) that manages the triggers of when account parameters on a provisioned device will need to be refreshed for accounts in each portfolio. To ensure consistent performance and usability, a set of minimum parameters configurable in a service profile can be implemented by CBP 580. To ensure that cloud-based payment transactions are processed according to the rules specified in the service profile for an account portfolio, CBP 580 performs various core functions during the lifetime of an account that has been enabled. These functions can include provisioning, active account management, verification for payment, transaction processing, life-cycle management and post-payment.

CBP 580 may create a service profile for a portfolio before an account is provisioned as a cloud-based payments account. Provisioning may include taking an enrolled account, create account information such as an alternate Primary Account Number (PAN) or a token acting as a PAN substitute, and inheriting service profile has been established for the portfolio. Once an account is provisioned, the relevant service profile details are shared with both the transaction processing and the on-device cloud-based payment logic in order to ensure that decision making can be done at transaction processing and during mobile application usage by the consumer.

Once an account is provisioned, active account management can be performed by CBP 580. Active account management can be initiated either from transaction processing activity or from mobile application activity. After the account has been provisioned, the active account management capability generates the initial set of account parameters to be deployed to portable communication device 510. The account parameters may include account information generated during provisioning (e.g., alternate PAN or token), as well as dynamic information to ensure the set of account parameters have only a limited use once delivered to the device. Dynamic information may include limited use cryptogram keys or dynamic data depending on what type of transaction is being supported. For example, the dynamic information may include limited use cryptogram keys to calculate cryptograms, as well as limited use dynamic data to support legacy dynamic card verification value or code based implementations.

During transaction processing, if the service profile parameters maintained by CBP 580 for a particular account indicate that account parameters on portable communication device 510 need to be replaced, the active account management capability of CBP 580 may connect to portable communication device 510 via MAP 570 to replenish account parameters. Likewise, if the on-device service profile parameters stored on portable communication device 510 indicate that account parameter replenishment is needed or is close to be being needed (i.e., by monitoring account parameter thresholds), then mobile application 514 can make a request to CBP 580 for account parameter replenishment.

Once portable communication device 510 has been provisioned to conduct cloud-based payments, transactions can be conducted via portable communication device 510 by interacting with a contactless reader 562 of an access device 560 (e.g., at a merchant location). Components of access device 560 may include point-of-sale (POS) terminal 564 and/or electronic cash register 566. Access device 560 can be coupled to acquirer 574 (e.g., via a merchant computer not shown). Acquirer 574 may be connected to an issuer or host processing system 572 via transaction processing network 584. Transaction processing network 584 may include one or more server computers. A server computer is typically a powerful computer or cluster of computers. For example, the server computer can be a large mainframe, a minicomputer cluster, or a group of servers functioning as a unit. In one example, the server computer may be a database server coupled to a Web server. Transaction processing network 584 may use any suitable wired or wireless network, including the Internet.

Transaction processing network 584 may include data processing subsystems, networks, and operations used to support and deliver authorization services, exception file services, transaction scoring services, and clearing and settlement services. An exemplary transaction processing network may include VisaNet™. Transaction processing networks such as VisaNet™ are able to process credit card transactions, debit card transactions, and other types of commercial transactions. VisaNet™, in particular, includes a VIP system (Visa Integrated Payments system) which processes authorization requests and a Base II system which performs clearing and settlement services.

Each of the entities (e.g., acquirer 1574, payment processing network 584, issuer or host processing system 572) may comprise one or more computers to enable communications, or to perform one or more of the functions described herein.

To conduct a cloud-based payment transaction, a user of portable communication device 510 may tap portable communication device 510 against contactless reader 562 (e.g., via NFC) of access device 560, or display an image such as a bar code or QR code on a screen of portable communication device 510 that can be scanned by contactless reader 562 (e.g., an optical scanner or reader) of access device 560. In some embodiments, portable communication device 510 may provide access device 560 with an account identifier (e.g., an alternate PAN, a token, etc.) and additional information such as limited-use account parameters or information derived from the limited-use account parameters. For example, an account identifier and/or additional information (e.g., transaction cryptogram) can be encoded in a bar code or QR code that is scanned by access device 560, or the account identifier and/or additional information can be transmitted to access device 560 via NFC. In some embodiments, the limited-use account parameters may include a transaction cryptogram.

Access device 560 or a merchant computer coupled to access device 560 may generate an authorization request message including the account identifier and additional information (e.g., limited-use account parameters, or information derived from the limited-use account parameters), and forward the authorization request message to acquirer 574. The authorization request message is then sent to transaction processing network 584. Transaction processing network 584 then forwards the authorization request message to the corresponding issuer or host processing system 572 associated with an issuer of the account associated with portable communication device 510.

After issuer or host processing system 572 receives the authorization request message, the authorization request message may be parsed, and information in the authorization request message may be sent to CBP 580 for verification. An authorization response message is then sent back to transaction processing network 584 to indicate whether the current transaction is authorized (or not authorized). Transaction processing network 184 then forwards the authorization response message back to acquirer 574. In some embodiments, transaction processing network 584 may decline the transaction even if issuer or host processing system 572 has authorized the transaction, for example depending on a value of a fraud risk score or depending if limited-use account parameters are verified by CBP 580. Acquirer 574 then sends the authorization response message to the merchant computer and/or access device 560. The authorization response results may be displayed by access device 560, or may be printed out on a physical receipt. Alternately, if the transaction is an online transaction, the merchant may provide a web page or other indication of the authorization response message as a virtual receipt. The receipts may include transaction data for the transaction.

At the end of the day, a normal clearing and settlement process can be conducted by transaction processing network 584. A clearing process is a process of exchanging financial details between an acquirer and an issuer to facilitate posting to a customer's payment account and reconciliation of the user's settlement position.

Figure 6:
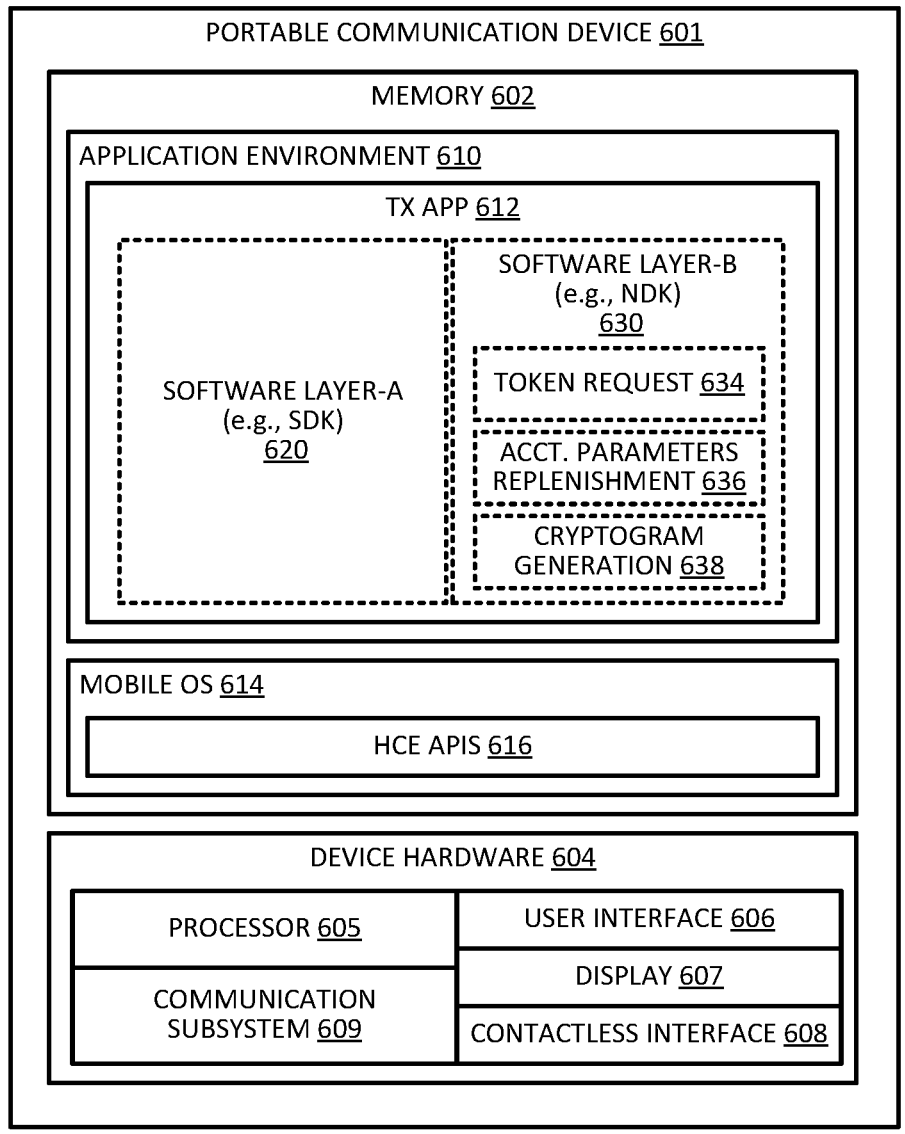
FIG. 6 illustrates a block diagram of an example of a portable communication device, according to some embodiments.

FIG. 6 illustrates a block diagram of a portable communication device 601 (e.g., implementing portable communication device 510) in which some embodiments of the processes described herein can be implemented. Portable communication device 601 may include device hardware 604 coupled to a memory 602. Device hardware 604 may include a processor 605, a communications subsystem 609, use interface 606, a display screen 607 (which may be part of user interface 606), and a contactless interface 608. Processor 605 can be implemented as one or more integrated circuits (e.g., one or more single core or multicore microprocessors and/or microcontrollers), and is used to control the operation of portable communication device 601. Processor 605 can execute a variety of programs in response to program code or computer-readable code stored in memory 602, and can maintain multiple concurrently executing programs or processes. Communications subsystem 606 may include one or more RF transceivers and/or connectors that can be used by portable communication device 601 to communicate with other devices and/or to connect with external networks. User interface 606 can include any combination of input and output elements to allow a user to interact with and invoke the functionalities of portable communication device 601. In some embodiments, display screen 607 may be part of user interface 606.

Contactless interface 608 may include one or more RF transceivers to interact with a contactless reader of an access device to conduct a transaction (e.g., payment transaction, access transaction, information exchange, etc.). In some embodiments, contactless interface 608 can be accessed by the mobile OS 614 using card emulation APIs 616 without requiring the use of a secure element. In some embodiments, display 607 can also be part of contactless interface 608, and is used, for example, to perform transactions using QR codes, bar codes, etc.

Memory 602 can be implemented using any combination of any number of non-volatile memories (e.g., flash memory) and volatile memories (e.g., DRAM, SRAM), or any other non-transitory storage medium, or a combination thereof media. Memory 602 may store a mobile OS 614 and a mobile application environment 610 where one or more mobile applications reside including transaction application 612 (e.g., mobile wallet application, mobile banking application, mobile payments application, merchant application, etc.) to be executed by processor 605. In some embodiments, mobile OS 614 may implement a set of card emulation APIs 616 that can be invoked by transaction application 612 to access contactless interface 608 to interact with an access device.

According to some embodiments, transaction application 612 can include multiple software layers. For example, transaction application 612 may include software layer 620 (e.g., SDK) and software layer 630 (e.g., NDK). Software layer 620 may include a set of public APIs that is used to implement non-security sensitive functions such user interface functions, as well as functions that may invoke security-sensitive functions implemented in software layer 630. Software layer 620 can be written in a high level programming language such as Java. Software layer 630 may include a native library to implement security-sensitive functions such as token request 634, account parameters replenishment 636, cryptogram generation 638, etc. Software layer 630 may be written in a low level programming language such as C or C++.

According to some embodiments, transaction application 612 can be bound to portable communication device 601 using the secure binding techniques described herein. The initialization process for generating the dynamic device identifier (DDID) used as the binding information is similar to initialization process flow 300 described above with reference to FIG. 3, and hence a detailed description of which need not be repeated. In some embodiments, the initialization process for binding transaction application 612 can be performed with a cloud-based transaction platform (CBP), or a computer associated with an entity (e.g., issuer, transaction processor, etc.) that incorporates the cloud-based transaction platform functionalities. For example, the server-generated DDID can by generated by the CBP.

Figure 7:
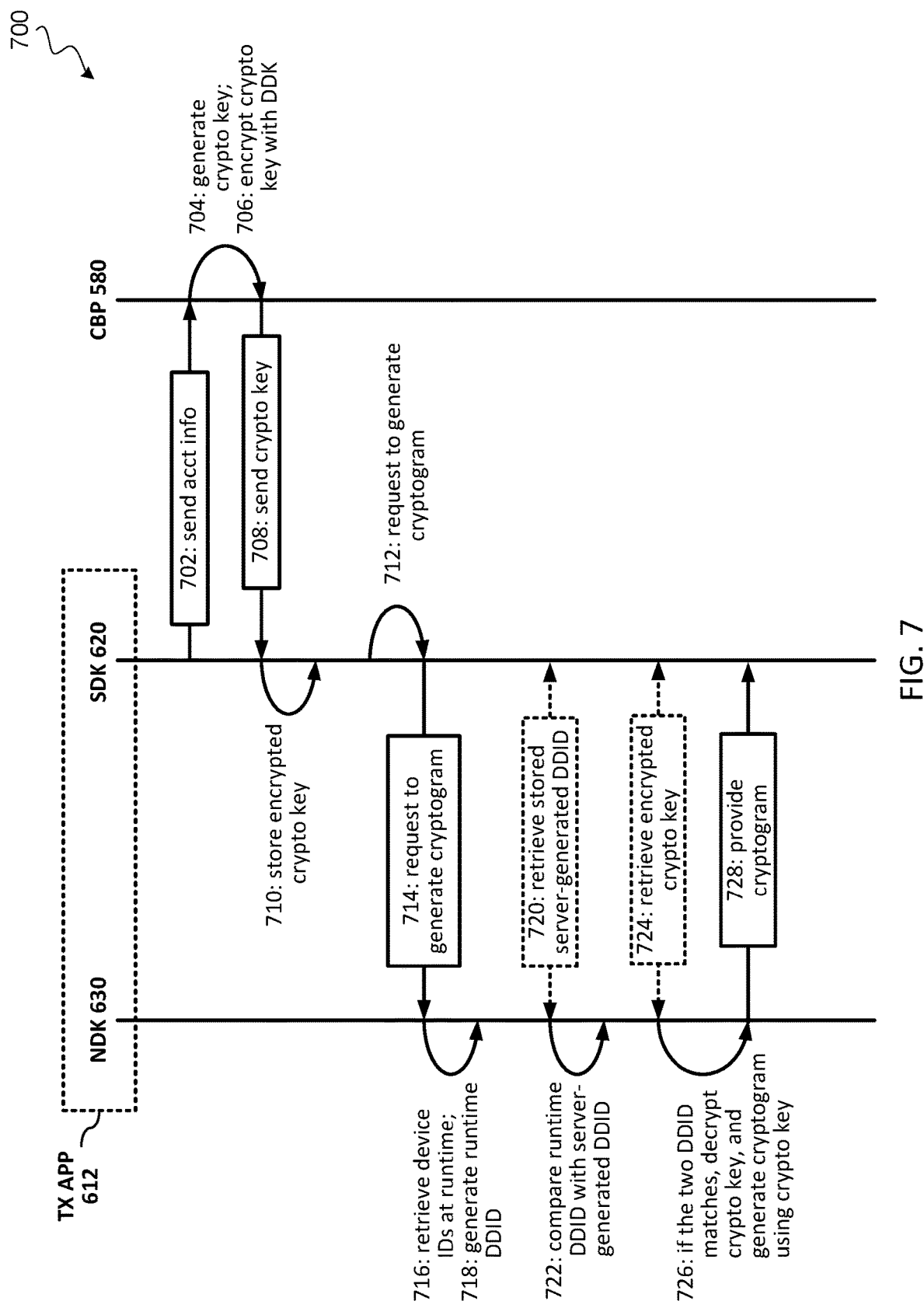
FIG. 7 illustrates an application process communication flow diagram, according to some embodiments.

FIG. 7 illustrates a process flow 700 that can be performed by transaction application 612, according to some embodiments. Prior to using transaction application 612 to conduct transactions, a user of the portable communication device may provide account information on transaction application 620 to enroll a payment account (e.g., banking or credit card account). At step 702, SDK 620 may provide the account information to CBP 580 to enroll the account for cloud-based transaction services.

At step 704, CBP 580 may verify the account information with an issuer of the account (if the issuer is a different entity than CBP 580), and generate account parameters including a cryptogram key for provisioning to transaction application 612. The cryptogram key is used by transaction application 612 as an encryption key to generate a transaction cryptogram during a transaction being conducted with the portable communication device. In some embodiments, the cryptogram key can be a limited-use key (LUK) in the sense that the cryptogram key can be used for only a limited time or a limited number of transactions, and may need to be renewed or replenished when the limited usage has been exhausted. The LUK may be associated with a set of one or more limited-use thresholds that limits the usage of the LUK, where once the usage of the LUK has exhausted or exceeded the set of one or more limited-use thresholds, a further transaction conducted using that LUK will be declined even if the underlying account is still in good standing. The set of one or more limited-use thresholds to enforce can be determined, for example, by an issuer of the account or by CBP 580 that provides the cloud-based transaction services. The set of one or more limited-use thresholds may include at least one of a time-to-live indicating the duration of time for which the LUK is valid, a predetermined number of transactions for which the LUK is valid, and/or a cumulative transaction amount indicating the total transaction amount summed across one or more transactions for which the LUK is valid, or any combination thereof. In some embodiments, the account parameters provisioned to transaction application 612 may also include a token that can be used as a substitute for an account identifier.

At step 706, CBP 580 encrypts the account parameters including the cryptogram key and/or token with the DDK, and sends the encrypted account parameters including the cryptogram key and/or token to application 612. At step 710, SDK 620 (or NDK 330) stores the encrypted account parameters including the cryptogram key and/or token. At this point, transaction application 612 has been provisioned, and a user can begin using portable communication device and transaction application 612 to conduct transactions.

During runtime execution of transaction application 612, at step 712, transaction application 612 may receive a request to generate a transaction cryptogram to conduct a transaction. The request may be received by SDK 620 in response to a user using the portable communication device to initiate a transaction. For example, the user may wave the portable communication device in proximity to an access device to initiate a transaction, or may engage a user interface element (e.g., pressing a "pay" button displayed by transaction application 612 on the user interface of the portable communication device) to initiate a transaction. Transaction application 612 may obtain additional information necessary for generating the transaction cryptogram, such as dynamic transaction data (e.g., transaction amount, etc.) from the access device.

At step 714, the request to generate the transaction cryptogram is forwarded from SDK 620 to NDK 630. At step 716, in response to receiving the request to generate a transaction cryptogram, the set of device identifiers used for generating the DDID is retrieved by NDK 660 from the portable communication device that is currently executing transaction application 612. If a DDID salt was used by CBP 580 to generate the server-generated DDID, the DDID salt is retrieved and decrypted with the DDK if necessary. At step 718, NDK 630 generates a runtime DDID using the same algorithm (e.g., HMAC) that was used to generate the server-generated DDID as described above.

At step 720, if the server-generated DDID was previously stored by SDK 620, NDK 630 retrieves the server-generated DDID from SDK 620. Alternatively, if the server-generated DDID was previously stored by NDK 630, NDK 630 retrieves the server-generated DDID from NDK 630. At step 722, NDK 630 compares the runtime DDID with the server-generated DDID to determine whether the runtime DDID matches the server-generated DDID. In some embodiments, the server-generated DDID may be stored in its encrypted form, and NDK 330 may encrypt the runtime DDID using the DDK, and compare the encrypted version of the server-generated DDID with the encrypted runtime DDID. In some embodiments, the server-generated DDID can be decrypted using the DDK, and the server-generated DDID can be compared with the runtime DDID in their unencrypted form.

If the runtime DDID does not match the server-generated DDID; the portable communication device currently executing transaction application 612 may be a different device than the device that had originally installed transaction application 612 and executed initialization process 300. In such case, NDK 630 may halt generation of the transaction cryptogram and prevent the transaction being conducted from continuing. In some embodiments, NDK 630 may inform SDK 620 to display an error message on a user interface of the portable communication device to indicate that the transaction cryptogram request is not authorized.

If the runtime DDID matches the server-generated DDID, the portable communication device currently executing transaction application 612 is determined to be the same portable communication device that had originally installed transaction application 612, and NDK 630 continues with execution of the transaction cryptogram generation. At step 724, if necessary, NDK 630 retrieves the cryptogram key (e.g., LUK) used for generating the transaction cryptogram from SDK 620. At step 726, NDK 630 generates the transaction cryptogram using the cryptogram key. In some embodiments, the transaction cryptogram can be generated by using the cryptogram key to encrypt account and transaction information such as an account identifier or a token, transaction information (e.g., transaction amount) obtained from an acceptance device, and/or other information such as application transaction counter values, etc. At step 728, NDK 630 provides the transaction cryptogram to SDK 620. SDK 620 may then pass the generated transaction cryptogram to an access device to conduct the transaction.

In some embodiments, a post-binding application digest as described above can be used as an additional mechanism for runtime verification of transaction application 612. For example, in addition to verifying the DDID, when NDK 630 receives a request to generate a transaction cryptogram, NDK 630 may re-compute the post-binding application digest of transaction application 612 at runtime, and compare it with the previously stored post-binding application digest to verify that transaction application 612 has not been modified after initialization. In some embodiments, the DDID verification and post-binding application digest verification can be triggered by the same or different events. For example, both DDID and post-binding application digest verifications may be triggered each time transaction application 612 is launched or started, whereas only DDID verification but not post-binding application digest verification may be triggered when a request to generate a transaction cryptogram is received. Verification of the DDID and/or post-binding application digest can also be performed when transaction application 612 receives a request to obtain a token from CBP 580 and/or replenish the account parameters (e.g., renew the LUK) from CBP 580). In some embodiments, verification of the DDID and/or post-binding application digest can also be performed whenever transaction application 612 communicates with CBP 580 and/or whenever transaction application communicates with an access device.

V. Exemplary Methods and Keys

Figure 8:
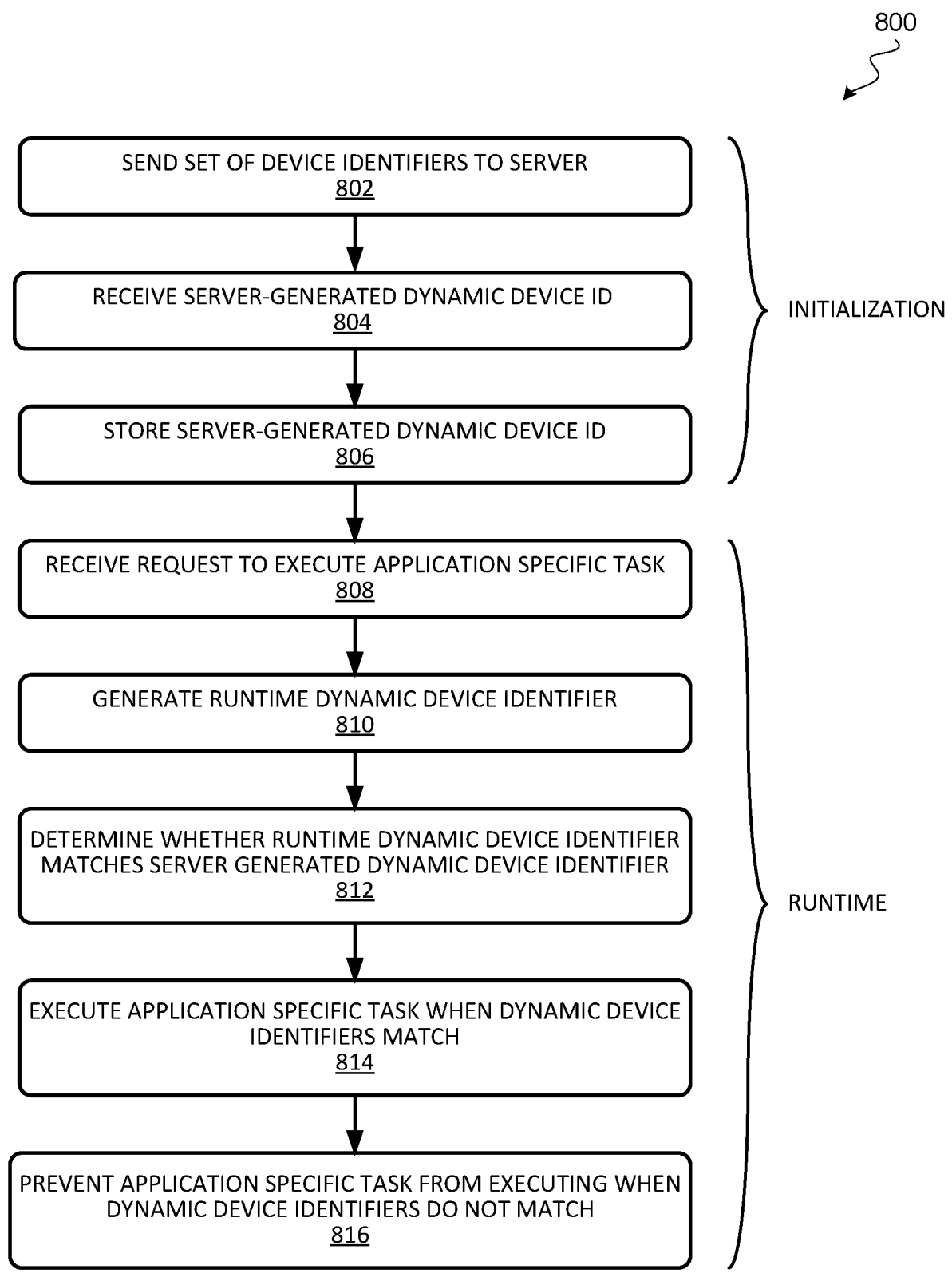
FIG. 8 illustrates a flow diagram of a process that an application may execute, according to some embodiments.

FIG. 8 illustrates a flow diagram 800 of a method for binding a software application to a communication device, according to some embodiments. Blocks 802 to 806 can be performed by an application during first time initialization of the application on a communication device. Blocks 808 to 816 can be performed by an application during runtime execution of the application.

At block 802, the application retrieves a set of device identifiers sends a set of device identifiers associated with the communication device to a server. The set of device identifiers can be encrypted using a server public key that is embedded into the application code of the application. At block 804, the application receives a server-generated dynamic device identifier that is generated based on the set of device identifiers. The server-generated dynamic device identifier may include a hash value computed over at least a portion of the set of device identifiers and a salt value generated by the server. In addition to receiving the server-generated dynamic device identifier, the application may also receive the salt value that the server used for generating the server-generated dynamic device identifier to enable the application to generate its own runtime dynamic device identifier during runtime execution of the application. At block 806, the application stores the server-generated dynamic device identifier, which acts as the binding information that binds the application to the communication device.

Subsequently, during runtime execution of the application, at block 808, the application may receive a request to execute an application specific task. In some embodiments, the request to execute an application specific task can be a request to execute a security-sensitive task such as a request to generate a cryptogram. For example, in some embodiments in which the application is a transaction application, the request can be a request to generate a transaction cryptogram that is transmitted to an access device to obtain authorization for the transaction. At block 810, in response to receiving the request to execute the application specific task, the application generates a runtime dynamic device identifier. At block 812, the application determines whether the runtime dynamic device identifier matches the server-generated dynamic device identifier. At block 814, if the runtime dynamic device identifier matches the server-generated dynamic device identifier, the application executes the requested application specific task. At block 816, if the runtime dynamic device identifier does not match the server-generated dynamic device identifier, the application specific task is prevented from being executed.

In some embodiments, the dynamic device identifier can be protected during storage and/or transit by encrypting the dynamic device identifier with a device derived key. The device derived key can be a symmetric key that is used for both encrypting and decrypting operations During initialization of the application, the server may generate a nonce value for deriving the device derived key. The application may receive the nonce value from the server, and the application may derive the device derived key based on the nonce value. The server may also separately generate the device derived key from the nonce value. The server-generated dynamic device identifier received by the application from the server may then be encrypted by the server using the device derived key, and decrypted by the application using the device derived key when needed. In some embodiments, a cryptogram key (e.g., provisioned by the server) that the application uses as an encryption key to generate cryptograms for the communication device can also be protected during storage and/or transit by encrypting cryptogram key with the device derived key FIG. 9 shows a table describing various keys that an application executing on a communication device may use to carry out the processes described herein, according to some embodiments. The keys can be stored, for example, in a key chain (e.g., dedicated key storage area) of the communication device, and may include server public key 902, device private key 904, device derivation key 906, and cryptogram key 908. In some embodiments, the key chain can be maintained by either the NDK or the SDK. In some embodiments, one or more of the individual keys can be stored by the SDK, while other keys can be stored by the NDK, or vice versa.

Server public key 902 is part of a server public-private key pair, and can be embedded in the NDK as part of the NDK code. Thus, server public key 902 can be provided to the communication device as part of the application package file downloaded or preloaded onto the communication device. Server public key 902 is used by the application to encrypt information sent from the application to the server.

Device private key 904 is part of a device public-private key pair, and can be generated by the NDK during the initialization process of the application. In some embodiments, the device public-private key pair can be a RSA key pair, and can be generate based on a nonce received for the server. Device private key 904 is used by the application to perform digital signing of information sent from the application to the server. Device private key 904 can also be used by the application to decrypt information received from the sever that has been encrypted by the server using the device public key component of the device key pair.

Device derivation key 906 is a symmetric key that is generated based on a nonce provided by the server. Device derivation key 906 can be generated by the NDK at the application side, and can also be separately generated by the server on the server side. Device derivation key 906 is used by the application to decrypt information received from the server that has been encrypted by the server using the server's device derivation key. Device derivation key 906 can also be used by the application to encrypt information that the application sends to the server. In some embodiments, once device derivation key 906 has been generated, the information transmitted between the server and the application can be encrypted with the device derivation key instead of the server and device public keys. Nevertheless, in such scenarios, the server and device keys can still be used to digitally sign and authenticate the information transmitted between the server and the application. In some embodiments, once device derivation key 906 has been generated, the information transmitted between the server and the application can be encrypted with the device derivation key in addition to being encrypted with the server and key public keys.

Cryptogram key 908 is an encryption key that is provisioned by the server onto the application. Cryptogram key 908 is used by the application to generate cryptograms for the communication device. In some embodiments, cryptograph key 908 can be used by the application to generate a transaction cryptogram that is transmitted to an access device to conduct a transaction with the communication device. For example, the transaction cryptogram can be transmitted from the communication device to the access device, and the access device can generate an authorization request message including the transaction cryptogram, and forward the authorization request message to an issuer to obtain authorization for the transaction. In some embodiments, cryptogram key 908 can be a limited-use key that is only valid for a limited time, limited number of transaction, and/or limited transaction amount. When the limited-use threshold of the limited-use key is or is about to be exceeded, the application and/or the server can initiate replenishment of the limited-use key (e.g., provide the application with a new limited-use key) so that further transactions can be conducted with the communication device.

Any of the computing devices, communication devices, computers, servers, and the like described herein can be implemented using one or more processors coupled to a memory that store code or instructions, which when executed by the one or more processors, cause the device to perform one or more of the methods and processes described herein. Memory, storage media, and computer-readable media for containing code, or portions of code described herein, can include any appropriate media known or used in the art, including storage media and communication media, such as but not limited to volatile and non-volatile, removable and non-removable media implemented in any method or technology for storage and/or transmission of information such as computer-readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, data signals, data transmissions, or any other medium which can be used to store or transmit the desired information and which can be accessed by the computer. Based on the disclosure and teachings provided herein, a person of ordinary skill in the art will appreciate other ways and/or methods to implement the various embodiments.

The above description is illustrative and is not restrictive. Many variations of the invention may become apparent to those skilled in the art upon review of the disclosure. The scope of the invention may, therefore, be determined not with reference to the above description, but instead may be determined with reference to the pending claims along with their full scope or equivalents.

The methods and processes described herein are exemplary in nature, and the methods and processes in accordance with some embodiments may perform one or more of the steps in a different order than those described herein, include one or more additional steps not specially described, omit one or more steps, combine one or more steps into a single step, split up one or more steps into multiple steps, and/or any combination thereof.

It may be understood that the present invention as described above can be implemented in the form of control logic using computer software in a modular or integrated manner. Based on the disclosure and teachings provided herein, a person of ordinary skill in the art may know and appreciate other ways and/or methods to implement the present invention using hardware and a combination of hardware and software.

Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

One or more features from any embodiment may be combined with one or more features of any other embodiment without departing from the scope of the invention.

A recitation of "a", "an" or "the" is intended to mean "one or more" unless specifically indicated to the contrary.

What is claimed is:

1. A method comprising:
   during initialization of an application on a communication device:
   receiving, by the application and from a server, a server-generated dynamic device identifier that is generated based on a device identifier of the communication device;
   storing, by the application, the server-generated dynamic device identifier;
   receiving, by the application, a nonce value from the server; and
   deriving, by the application, a device derived key based on the nonce value;
   during runtime execution of the application:
   receiving, by the application and from the server, a cryptogram key that is encrypted by the server using the device derived key, wherein the cryptogram key is used as an encryption key by the application to encrypt data to generate a cryptogram for the communication device;
   receiving, by the application, a request to execute an application specific task including generation of the cryptogram; and
   in response to receiving the request:
   generating, by the application, a runtime dynamic device identifier;
   determining whether the runtime dynamic device identifier matches the server-generated dynamic device identifier;
   executing the application specific task when the runtime dynamic device identifier matches the server-generated dynamic device identifier; and
   preventing the application specific task from being executed when the runtime dynamic device identifier does not match the server-generated dynamic device identifier.

2. The method of claim 1, wherein the server-generated dynamic device identifier received from the server is encrypted by the server using the device derived key.

3. The method of claim 1, wherein the server-generated dynamic device identifier is a hash value computed over at least the device identifier and a salt value.

4. The method of claim 3, further comprising:
   during the initialization of the application:
   receiving, by the application, the salt value that the server used for generating the server-generated dynamic device identifier.

5. The method of claim 1, wherein the application is partitioned into a first software layer written in a first programming language and a second software layer written in a second programming language.

6. The method of claim 5, wherein the server-generated dynamic device identifier is stored in the first software layer of the application, and the runtime dynamic device identifier is generated by the second software layer.

7. The method of claim 1, wherein the application is a transaction application, and the cryptogram is used for authorizing a transaction being conducted with the communication device.

8. A method comprising:
receiving, by a server computer from a communication device during initialization of an application on the communication device, a device identifier associated with the communication device;
transmitting, by the server computer to the communication device, a server-generated dynamic device identifier that is generated based on the device identifier of the communication device;
transmitting, by the server computer to the communication device, a nonce value that is used by the communication device to generate a device derived key; and
transmitting, by the server computer to the communication device, a cryptogram key that is encrypted using the device derived key, wherein the cryptogram key is used as an encryption key by the communication device to encrypt data to generate a cryptogram for the communication device,
wherein during runtime execution of the application, the application:
generates a runtime dynamic device identifier;
determines that the runtime dynamic device identifier matches the server-generated dynamic device identifier; and
generates the cryptogram using the cryptogram key in response to determining that the runtime dynamic device identifier matches the server-generated dynamic device identifier.

9. The method of claim 8, wherein the server-generated dynamic device identifier is encrypted using the device derived key.

10. The method of claim 8, wherein the server-generated dynamic device identifier is a hash value computed over at least the device identifier and a salt value.

11. The method of claim 10, further comprising:
transmitting, by the server computer to the communication device, the salt value used for generating the server-generated dynamic device identifier.

12. The method of claim 8, wherein the application is partitioned into a first software layer written in a first programming language and a second software layer written in a second programming language.

13. The method of claim 12, wherein the server-generated dynamic device identifier is stored in the first software layer of the application, and the runtime dynamic device identifier is generated by the second software layer.

14. The method of claim 8, wherein the application is a transaction application, and the cryptogram is used for authorizing a transaction being conducted with the communication device.

15. A server computer comprising:
a processor; and
a memory coupled to the processor, the memory storing instructions, which when executed by the processor, causes the server computer to perform operations including:
receiving, from a communication device during initialization of an application on the communication device, a device identifier associated with the communication device;
transmitting, to the communication device, a server-generated dynamic device identifier that is generated based on the device identifier of the communication device;
transmitting, to the communication device, a nonce value that is used by the communication device to generate a device derived key; and
transmitting, to the communication device, a cryptogram key that is encrypted using the device derived key, wherein the cryptogram key is used as an encryption key by the communication device to encrypt data to generate a cryptogram for the communication device,
wherein during runtime execution of the application, the application:
generates a runtime dynamic device identifier;
determines that the runtime dynamic device identifier matches the server-generated dynamic device identifier; and
generates the cryptogram using the cryptogram key in response to determining that the runtime dynamic device identifier matches the server-generated dynamic device identifier.

16. The server computer of claim 15, wherein the server-generated dynamic device identifier is encrypted using the device derived key.

17. The server computer of claim 15, wherein the server-generated dynamic device identifier is a hash value computed over at least the device identifier and a salt value.

18. The server computer of claim 17, further comprising:
transmitting, by the server computer to the communication device, the salt value used for generating the server-generated dynamic device identifier.

19. The server computer of claim 15, wherein the application is partitioned into a first software layer written in a first programming language and a second software layer written in a second programming language.

20. The server computer of claim 19, wherein the server-generated dynamic device identifier is stored in the first software layer of the application, and the runtime dynamic device identifier is generated by the second software layer.

* * * * *